(12) United States Patent
Tidwell et al.

(10) Patent No.: US 8,528,077 B1
(45) Date of Patent: Sep. 3, 2013

(54) COMPARING EVENTS FROM MULTIPLE NETWORK SECURITY DEVICES

(75) Inventors: Kenny Tidwell, Los Altos, CA (US); Debabrata Dash, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3240 days.

(21) Appl. No.: 10/821,459

(22) Filed: Apr. 9, 2004

(51) Int. Cl.
*G06F 11/00* (2006.01)

(52) U.S. Cl.
USPC ............ 726/22; 726/23; 726/24; 726/25

(58) Field of Classification Search
USPC .......................................... 713/201; 726/22
See application file for complete search history.

(56) References Cited

U.S. PATENT DOCUMENTS

| | | | |
|---|---|---|---|
| 5,717,919 A | 2/1998 | Kodavalla et al. | |
| 5,850,516 A | 12/1998 | Schneier | |
| 5,956,404 A | 9/1999 | Schneier et al. | |
| 5,978,475 A | 11/1999 | Schneier et al. | |
| 6,134,664 A | 10/2000 | Walker | |
| 6,192,034 B1 | 2/2001 | Hsieh et al. | |
| 6,300,872 B1 * | 10/2001 | Mathias et al. | 340/540 |
| 6,321,338 B1 | 11/2001 | Porras et al. | |
| 6,408,391 B1 * | 6/2002 | Huff et al. | 726/22 |
| 6,408,404 B1 | 6/2002 | Ladwig | |
| 6,484,203 B1 | 11/2002 | Porras et al. | |
| 6,694,362 B1 | 2/2004 | Secor et al. | |
| 6,704,874 B1 * | 3/2004 | Porras et al. | 726/22 |
| 6,708,212 B2 | 3/2004 | Porras et al. | |
| 6,711,615 B2 | 3/2004 | Porras et al. | |
| 6,839,850 B1 | 1/2005 | Campbell et al. | |
| 6,928,556 B2 * | 8/2005 | Black et al. | 726/6 |
| 6,966,015 B2 | 11/2005 | Steinberg et al. | |
| 6,988,208 B2 * | 1/2006 | Hrabik et al. | 726/23 |
| 7,039,953 B2 | 5/2006 | Black et al. | |
| 7,043,727 B2 | 5/2006 | Bennett et al. | |
| 7,089,428 B2 | 8/2006 | Farley et al. | |
| 7,096,498 B2 * | 8/2006 | Judge | 726/22 |
| 7,159,237 B2 | 1/2007 | Schneier et al. | |
| 7,171,689 B2 | 1/2007 | Beavers | |
| 7,219,239 B1 * | 5/2007 | Njemanze et al. | 726/3 |

(Continued)

FOREIGN PATENT DOCUMENTS

| | | |
|---|---|---|
| WO | WO 02/45315 A2 | 6/2002 |
| WO | WO 02/060117 A1 | 8/2002 |

(Continued)

OTHER PUBLICATIONS http://www.securityfocus.com/infocus/1231.*

(Continued)

*Primary Examiner* — William Powers
*Assistant Examiner* — Yonas Bayou

(57) ABSTRACT

Events are received from a plurality of security devices (which may be similar or different devices, e.g., intrusion detection systems configured to monitor network traffic) and divided into a plurality of event flows. Comparing the event flows (e.g., using statistical correlation methods) then generates one or more meta-events. The received events may be divided into different event flows on the basis of the security device which generated the events. The meta-events may be generated by evaluating a perimeter defense device through comparison of the different event flows. In some cases, various ones of the security devices may be inside or outside a perimeter defined by the perimeter defense device.

20 Claims, 5 Drawing Sheets

(56) References Cited

U.S. PATENT DOCUMENTS

| | | | |
|---|---|---|---|
| 7,260,844 B1 | 8/2007 | Tidwell et al. | |
| 7,278,160 B2 | 10/2007 | Black et al. | |
| 7,308,689 B2 | 12/2007 | Black et al. | |
| 7,333,999 B1 | 2/2008 | Njemanze | |
| 7,339,477 B2* | 3/2008 | Puzio et al. | 340/572.1 |
| 7,376,969 B1* | 5/2008 | Njemanze et al. | 726/22 |
| 8,365,278 B1* | 1/2013 | Njemanze et al. | 726/22 |
| 2002/0019945 A1 | 2/2002 | Houston et al. | |
| 2002/0099958 A1* | 7/2002 | Hrabik et al. | 713/201 |
| 2002/0104014 A1 | 8/2002 | Zobel et al. | |
| 2002/0138762 A1* | 9/2002 | Horne | 713/201 |
| 2002/0147803 A1 | 10/2002 | Dodd et al. | |
| 2002/0184532 A1 | 12/2002 | Hackenberger et al. | |
| 2003/0084349 A1 | 5/2003 | Friedrichs et al. | |
| 2003/0093514 A1 | 5/2003 | Valdes et al. | |
| 2003/0093692 A1 | 5/2003 | Porras | |
| 2003/0101358 A1 | 5/2003 | Porras et al. | |
| 2003/0188189 A1 | 10/2003 | Desai et al. | |
| 2003/0221123 A1 | 11/2003 | Beavers | |
| 2004/0010718 A1 | 1/2004 | Porras et al. | |
| 2004/0024864 A1 | 2/2004 | Porras et al. | |
| 2004/0044912 A1 | 3/2004 | Connary et al. | |
| 2004/0221191 A1 | 11/2004 | Porras et al. | |
| 2005/0027845 A1 | 2/2005 | Secor et al. | |
| 2005/0204404 A1* | 9/2005 | Hrabik et al. | 726/22 |
| 2005/0251860 A1* | 11/2005 | Saurabh et al. | 726/23 |
| 2006/0069956 A1 | 3/2006 | Steinberg et al. | |
| 2006/0212932 A1 | 9/2006 | Patrick et al. | |
| 2007/0118905 A1 | 5/2007 | Morin et al. | |
| 2007/0150579 A1 | 6/2007 | Morin et al. | |
| 2007/0162973 A1 | 7/2007 | Schneier et al. | |
| 2007/0260931 A1 | 11/2007 | Aguilar-Macias et al. | |
| 2008/0104046 A1 | 5/2008 | Singla et al. | |
| 2008/0104276 A1 | 5/2008 | Lahoti et al. | |
| 2008/0162592 A1 | 7/2008 | Huang et al. | |
| 2008/0165000 A1 | 7/2008 | Morin et al. | |

FOREIGN PATENT DOCUMENTS

| | | |
|---|---|---|
| WO | WO 02/078262 A1 | 10/2002 |
| WO | WO 02/101988 A2 | 12/2002 |
| WO | WO 03/009531 A2 | 1/2003 |
| WO | WO 2004/019186 A2 | 3/2004 |

OTHER PUBLICATIONS

Heberlein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.

Javitz, H. S., et al., "The NIDES Statistical Component Description and Justification," SRI Project 3131, Contract N00039-92-C-0015, Annual Report, A010, Mar. 7, 1994.

Jou, Y. F., et al., "Architecture Design of a Scalable Intrusion Detection System for the Emerging Network Infrastructure," MCNC, Technical Report CDRL A005, Apr. 1997.

Porras, P. A., et al., "Live Traffic Analysis of TCP/IP Gateways," Symposium on Networks and Distributed Systems Security, Internet Society, Mar. 1998.

Robinson, S. L., "Memorandum Opinion" In *SRI International, Inc. v. Internet Security Systems, Inc.* and Symantec Corporation (D. Del., Civ. No. 04-1199-SLR), Oct. 17, 2006.

Valdes, A., et al., "Statistical Methods for Computer Usage Anomaly Detection Using NIDES (Next-Generation Intrusion Detection Expert System)," Proceedings of the Third International Workshop on Rough Sets and Soft Computing (RSSC 94), Jan. 27, 1995, San Jose, CA, pp. 306-311.

ArcSight, "Product Info: Product Overview and Architecture," date unknown, [online] [Retrieved on Oct. 25, 2002] Retrieved from the Internet <URL: http://www.arcsight.com/product.htm>.

ArcSight, "Product Info: 360° Intelligence Yields Precision Risk Management," date unknown, [online] [Retrieved on Oct. 25, 2002] Retrieved from the Internet <URL: http://www.arcsight.com/product_info01.htm>.

ArcSight, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.

ArcSight, "Product Info: ArcSight Cross-Device Correlation," date unknown, [online] [Retrieved on Oct. 25, 2005] Retrieved from the Internet <URL: http://www.arcsight.com/product_info03.htm>.

ArcSight, "Product Info: ArcSight Manager," date unknown, [online] [Retrieved on Oct. 25, 2002] Retrieved from the Internet <URL: http://www.arcsight.com/product_info04.htm>.

ArcSight, "Product Info: ArcSight Console," date unknown, [online] [Retrieved on Nov. 15, 2002] Retrieved from the Internet <URL: http:www.arcsight.com/product_info05.htm>.

ArcSight, "Product Info: ArcSight Reporting System," date unknown, [online] [Retrieved on Oct. 25, 2002] Retrieved from the Internet <URL: http:www.arcsight.com/product_info06.htm>.

ArcSight, "Product Info: Enterprise Scaling," date unknown, [online] [Retrieved on Oct. 25, 2002] Retrieved from the Internet <URL: http://www.arcsight.com/product_info07.htm>.

ArcSight, "Security Management for the Entreprise," 2002, [online] [Retrieved on Oct. 25, 2002] Retrieved from the Internet <URL: http:www.arcsight.com/>.

Burleson, D., "Taking Advantage of Object Partitioning in Oracle8i," Nov. 8, 2000, [online] [Retrieved on Apr. 20, 2004] Retrieved from the Internet <URL: http://www.dba-oracle.com/art_partit.htm>.

Derodeff, C. "Got Correlation? Not Without Normalization," 2002, [online] Retrieved from the Internet <URL.

Cheung, S. et al., "Emerald Intrusion Incident Report: 601 Message Specification," Aug. 10, 2000, System Design Laboratory, SRI International.

National Institute of Standards and Technology (NIST), "Federal Information Processing Standards Publication (FIPS PUB) 199: Standards for Security Categorization of Federal Information and Information Systems", Feb. 2004.

Haley Enterprise, "Production Systems," 2002, [online] [Retrieved on Oct. 29, 2002] Retrieved from the Internet <URL: http://www.haley.com/0072567836705810/ProductionSystems.html>.

Haley Enterprise, "The Rete Algorithm," 2002, [online] [Retrieved on Oct. 29, 2002] Retrieved from the Internet <URL: http://www.haley.com/0072567838705810/ReteAlgorithm.html>.

Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.

Halme, L.R. et al., "AINT Misbehaving: A Taxonomy of Anti-Intrusion Techniques," 2000, [online] [Retrieved on Nov. 1, 2002] Retrieved from the Internet <URL: http://www.sans.org/newlook/resources/IDFAQ/aint.htm>.

Lindqvist, U. et al., "Detecting Computer and Network Misuse Through the Production-Based Expert System Toolset (P-BEST)," Proceedings of the IEEE Symposium on Security and Privacy, Oakland, California, May 9-12, 1999.

CERT Coordination Center, "Overview of Attack Trends," 2002, [online] Retrieved from the Internet <URL: http://www.cert.org/archive/pdf/attack_trends.pdf>.

Porras, P.A. et al., "EMERALD: Event Monitoring Enabling Responses to Anomalous Live Disturbances," Oct. 1997, Proceedings of the 20th NIST-NCSC National Information Systems Security (NISS) Conference.

Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.

Ingargiola, G., "The Rete Algorithm," date unknown, [online] [Retrieved on Oct. 29, 2002] Retrieved from the Internet <URL: http://yoda.cis.temple.edu:8080/UGAIWWW/lectures/rete.html>.

Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newlook/resources/IDFAQ/matching.htm>.

National Institutes of Health (NIH), "Table 1: Security Categorization of Federal Information and Information Systems," revised Jul. 8, 2005, [online],[retrieved on Apr. 6, 2006] Retrieved from the Internet <URL: http://irm.cit.nih.gov/security/table1.htm>.

Wood, M., et al., "Internet-Draft: Intrusion Detection Message Exchange Requirements," Jun. 23, 2002, [online] [Retrieved on Nov. 1, 2002] Retrieved from the Internet <URL: http://www.silicondefense.com/idwg/draft-ietf-idwg-requirements-07.txt>.

ArcSight, "About ArcSight Team," date unknown, [online] [Retrieved on Oct. 25, 2002] Retrieved from the Internet <URL: http://www.arcsight.com/about_team.htm>.

ArcSight, "About Overview," Oct. 14, 2002, [online] [Retrieved on Apr. 21, 2006] Retrieved from the Internet <URL: http://web.archive.org/web/20021014041614/http://www.arcsight.com/about.htm>.

ArcSight, "Contact Info," date unknown, [online] [Retrieved on Oct. 25, 2002] Retrieved from the Internet <URL: http://www.arcsight.com/contact.htm>.

U.S. Appl. No. 60/405,921, filed Aug. 26, 2002, Gisby et al.

ArcSight, "Enterprise Coverage: Technology Architecture," date unknown, [online] [Retrieved on Nov. 11, 2007] Retrieved from the Internet <URL: http://www.snaiso.com/Documentation/Arcsight/arcsight_archdta.pdf>.

ArcSight, "Managed Process: ArcSight Reporting System," date unknown, [online] [Retrieved on Nov. 11, 2007] Retrieved from the Internet <URL: http://www.snaiso.com/Documentation/Arcsight/arcsight_reportsys.pdf>.

ArcSight, "Managed Process: Console-Based Management," date unknown, [online] [Retrieved on Nov. 11, 2007] Retrieved from the Internet <URL: http://www.snaiso.com/Documentation/Arcsight/arcsight_console.pdf>.

ArcSight, "Precision Intelligence: SmartRules™ and Cross-Correlation," date unknown, [online] [Retrieved on Nov. 11, 2007] Retrieved from the Internet <URL: http://www.snaiso.com/Documentation/Arcsight/arcsight_correlation.pdf>.

ArcSight, "Precision Intelligence: SmartAgent™," date unknown, [online] [Retrieved on Nov. 11, 2007] Retrieved from the Internet <URL: http://www.ossmanagement.com/SmartAgent.pdf>.

Derodeff, C. "Got Correlation? Not Without Normalization," 2002, [online] [Retrieved on Nov. 11, 2007] Retrieved from the Internet <URL: http://www.svic.com/papers/pdf/Got-Correlation__rmalization.pdf>.

U.S. Appl. No. 10/308,767, filed Dec. 2, 2002.
U.S. Appl. No. 10/308,548, filed Dec. 2, 2002.
U.S. Appl. No. 10/308,941, filed Dec. 2, 2002.
U.S. Appl. No. 10/308,416, filed Dec. 2, 2002.
U.S. Appl. No. 10/308,418, filed Dec. 2, 2002.
U.S. Appl. No. 10/308,417, filed Dec. 2, 2002.
U.S. Appl. No. 10/308,584, filed Dec. 2, 2002.
U.S. Appl. No. 10/733,073, filed Dec. 10, 2003.
U.S. Appl. No. 10/713,471, filed Nov. 14, 2003.
U.S. Appl. No. 10/683,221, filed Oct. 10, 2003.
U.S. Appl. No. 10/683,191, filed Oct. 10, 2003.
U.S. Appl. No. 10/839,563, filed May 4, 2004.
U.S. Appl. No. 10/976,075, filed Oct. 27, 2004.
U.S. Appl. No. 10/975,962, filed Oct. 27, 2004.
U.S. Appl. No. 10/974,105, filed Oct. 27, 2004.
U.S. Appl. No. 11/029,920, filed Jan. 4, 2005.
U.S. Appl. No. 11/021,601, filed Dec. 23, 2004.
U.S. Appl. No. 11/070,024, filed Mar. 1, 2005.
U.S. Appl. No. 11/740,203, filed Apr. 25, 2007.
U.S. Appl. No. 11/836,251, filed Aug. 9, 2007.
U.S. Appl. No. 12/098,322, filed Apr. 4, 2008.
U.S. Appl. No. 11/023,942, filed Dec. 24, 2004, pp. 1-26.

* cited by examiner

COMPARING EVENTS FROM MULTIPLE NETWORK SECURITY DEVICES

FIELD OF THE INVENTION

The present invention relates to a computer-based system for capturing security events from heterogeneous and homogenous sources, and comparing such events to generate a meta-event.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, intrusion detection systems (IDS) have been developed to help uncover attempts by unauthorized persons and/or devices to gain access to computer networks and the information stored therein. In addition, network devices such as routers and firewalls maintain activity logs that can be used to examine such attempts.

Intrusion detection may be regarded as the art of detecting inappropriate, incorrect or anomalous activity within or concerning a computer network or system. The most common approaches to intrusion detection are statistical anomaly detection and pattern-matching detection. IDS that operate on a host to detect malicious activity on that host are called host-based IDS (HIDS), which may exist in the form of host wrappers/personal firewalls or agent-based software, and those that operate on network data flows are called network-based IDS (NIDS). Host-based intrusion detection involves loading software on the system (the host) to be monitored and using log files and/or the host's auditing agents as sources of data. In contrast, a network-based intrusion detection system monitors the traffic on its network segment and uses that traffic as a data source. Packets captured by the network interface cards are considered to be of interest if they match a signature.

Regardless of the data source, there are two complementary approaches to detecting intrusions: knowledge-based approaches and behavior-based approaches. Almost all IDS tools in use today are knowledge-based. Knowledge-based intrusion detection techniques involve comparing the captured data to information regarding known techniques to exploit vulnerabilities. When a match is detected, an alarm is triggered. Behavior-based intrusion detection techniques, on the other hand, attempt to spot intrusions by observing deviations from normal or expected behaviors of the system or the users (models of which are extracted from reference information collected by various means). When a suspected deviation is observed, an alarm is generated.

Advantages of the knowledge-based approaches are that they have the potential for very low false alarm rates, and the contextual analysis proposed by the intrusion detection system is detailed, making it easier for a security officer using such an intrusion detection system to take preventive or corrective action. Drawbacks include the difficulty in gathering the required information on the known attacks and keeping it up to date with new vulnerabilities and environments.

Advantages of behavior-based approaches are that they can detect attempts to exploit new and unforeseen vulnerabilities. They are also less dependent on system specifics. However, the high false alarm rate is generally cited as a significant drawback of these techniques and because behaviors can change over time, the incidence of such false alarms can increase.

Regardless of whether a host-based or a network-based implementation is adopted and whether that implementation is knowledge-based or behavior-based, an intrusion detection system is only as useful as its ability to discriminate between normal system usage and true intrusions (accompanied by appropriate alerts). If intrusions can be detected and the appropriate personnel notified in a prompt fashion, measures can be taken to avoid compromises to the protected system. Otherwise such safeguarding cannot be provided. Accordingly, what is needed is a system that can provide accurate and timely intrusion detection and alert generation so as to effectively combat attempts to compromise a computer network or system.

SUMMARY OF THE INVENTION

In an embodiment of the present invention, events are received from a plurality of security devices (which may be similar or different devices, e.g., intrusion detection systems configured to monitor network traffic) and divided into a plurality of event flows. Comparing the event flows (e.g., using statistical correlation methods) then generates one or more meta-events. The received events may be divided into different event flows on the basis of the security device that generated the events. The meta-events may be generated by evaluating a perimeter defense device through comparison of the different event flows. In some cases, various ones of the security devices may be inside or outside a perimeter defined by the perimeter defense device.

BRIEF DESCRIPTION OF THE DRAWINGS

The present invention is illustrated by way of example, and not limitation, in the figures of the accompanying drawings in which.

DETAILED DESCRIPTION

Figure 1:
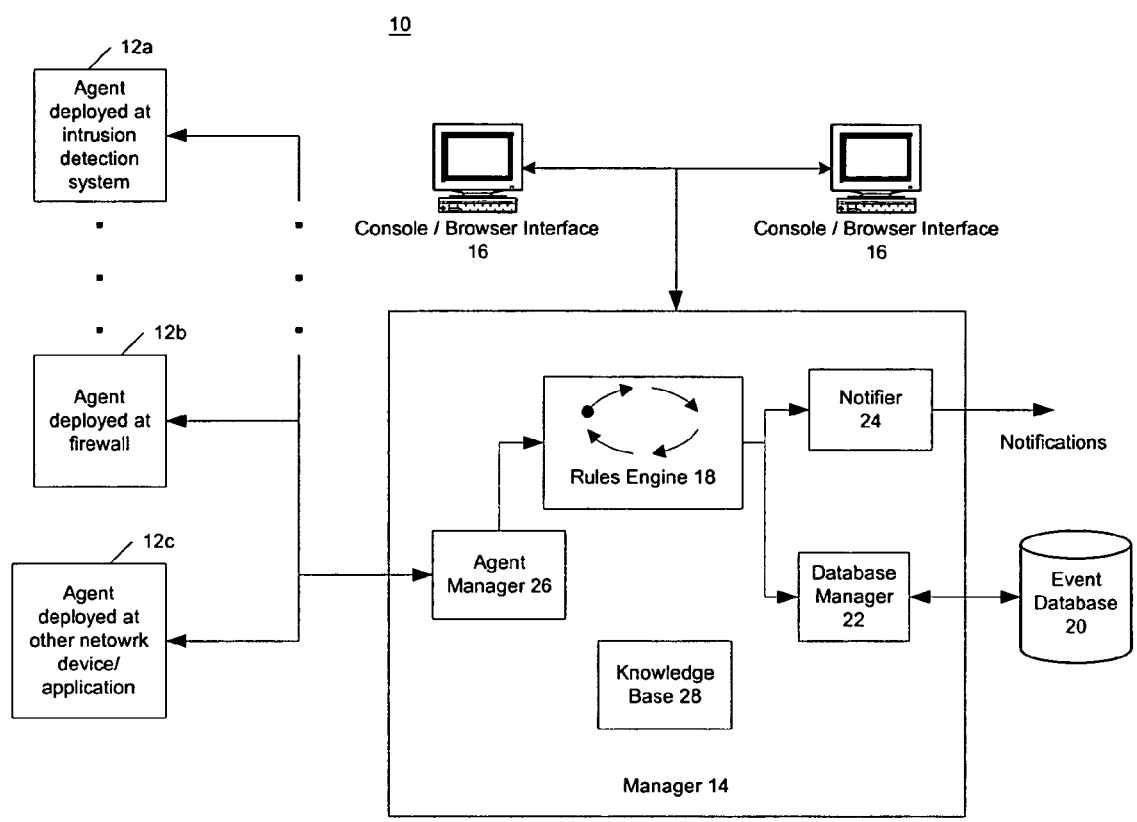
FIG. 1 is a block diagram of a network security system according to one embodiment of the present invention.

Although the present system will be discussed with reference to various illustrated examples, these examples should not be read to limit the broader spirit and scope of the present invention. For example, the examples presented herein describe distributed agents, managers and consoles, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, an example of a computer-based network security system 10 architected in accordance with an embodiment of the present invention is illustrated. System 10 includes agents 12, one or more managers 14 and one or more consoles 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12 are software programs that provide efficient, real-time (or near real-time) local event data capture and filtering from a variety of network security devices and/or applications. The primary sources of security events are common network security devices, such as firewalls, intrusion detection systems and operating system logs. Agents 12 can collect events from any source that produces event logs or messages and can operate at the native device, at consolidation points within the network, and/or through simple network management protocol (SNMP) traps.

Agents 12 are configurable through both manual and automated processes and via associated configuration files. Each agent 12 may include one or more software modules including a normalizing component, a time correction component, an aggregation component, a batching component, a resolver component, a transport component, and/or additional components. These components may be activated and/or deactivated through appropriate commands in the configuration file.

Managers 14 may be server-based components that further consolidate, filter and cross-correlate events received from the agents, employing a rules engine 18 and a centralized event database 20. One role of manager 14 is to capture and store all of the real-time and historic event data to construct (via database manager 22) a complete, enterprise-wide picture of security activity. The manager 14 also provides centralized administration, notification (through one or more notifiers 24), and reporting, as well as a knowledge base 28 and case management workflow. The manager 14 may be deployed on any computer hardware platform and one embodiment utilizes a relational database management system such as an Oracle™ database to implement the event data store component. Communications between manager 14 and agents 12 may be bi-directional (e.g., to allow manager 14 to transmit commands to the platforms hosting agents 12) and encrypted. In some installations, managers 14 may act as concentrators for multiple agents 12 and can forward information to other managers (e.g., deployed at a corporate headquarters).

Consoles 16 are computer- (e.g., workstation-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal or handheld computer (which takes the place of console 16) to provide some or all of the functionality of a console 16. Browser access is particularly useful for security professionals that are away from the consoles 16 and for part-time users. Communication between consoles 16 and manager 14 is bi-directional and may be encrypted.

Through the above-described architecture the present invention can support a centralized or decentralized environment. This is useful because an organization may want to implement a single instance of system 10 and use an access control list to partition users. Alternatively, the organization may choose to deploy separate systems 10 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. Systems 10 can also be deployed in a corporate hierarchy where business divisions work separately and support a rollup to a centralized management function.

The exemplary network security system illustrated in FIG. 1 is described in further detail in U.S. application Ser. No. 10/308,415, entitled "Real Time Monitoring and Analysis of Events from Multiple Security Devices", filed Dec. 2, 2001, which is hereby incorporated fully by reference.

Figure 2:
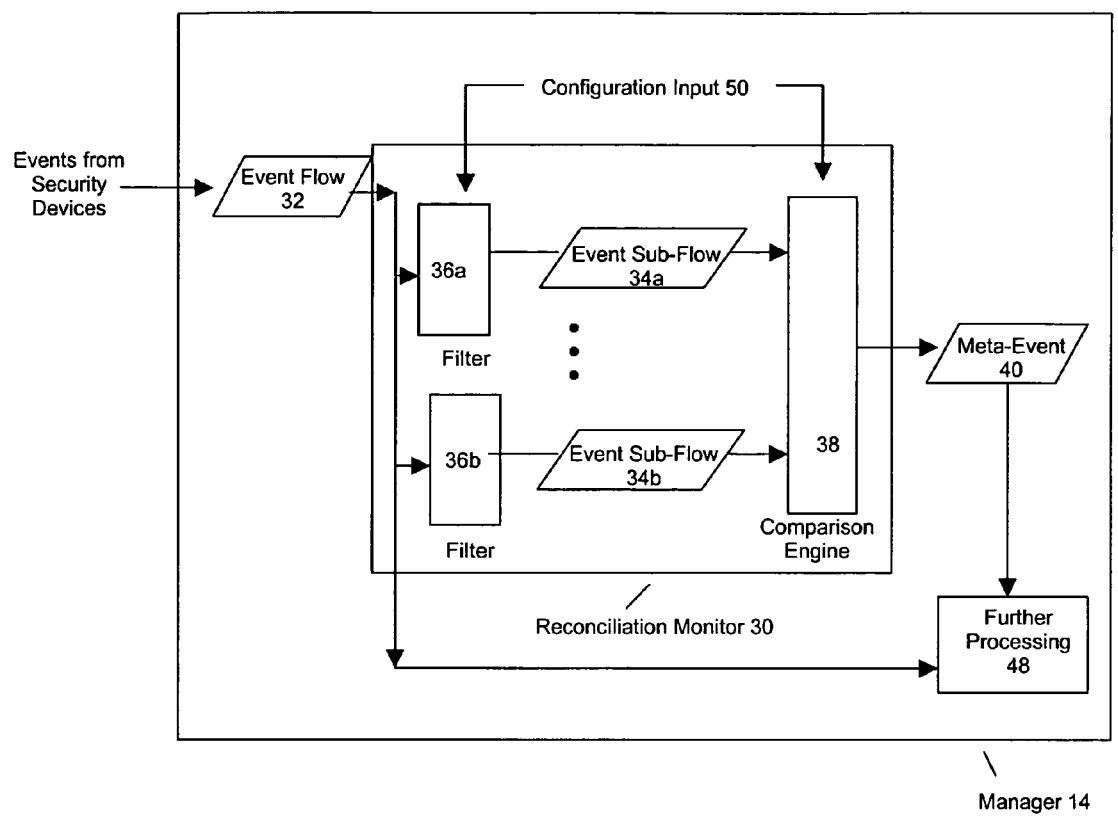
FIG. 2 is a block diagram of a manager of a network security system according to one embodiment of the present invention.

FIG. 2 illustrates another aspect of one embodiment of the manager 14 shown in FIG. 1. In one embodiment, manager 14 includes a reconciliation monitor 30 that compares event sub-flows to generate meta-events. The reconciliation monitor 30 is just one specific type of data monitor that can be implemented by the manager 14. In general, a data monitor is a module or component that listens to the event flow from the various security devices and analyzes the data contained in the events. The names "data monitor" and "reconciliation monitor" are purely descriptive, similar or identical functionality may be provided under many different names, e.g., "flow monitor," and "device comparator," respectively. The names of the various components do not limit the embodiment of the present invention.

Referring to FIG. 2, the manager 14 receives events from the various security devices (IDSs, Firewalls, etc.) as discussed above. These events constitute an event flow 32, referring to the aggregate stream of events received by the manager 14. In one embodiment, the event flow 32 is provided to the reconciliation monitor 30 for analysis. The reconciliation monitor 30 may receive the event flow 32 from the agent manager 26, and may operate in sequence (before or after) the rules engine 18 or in parallel.

In one embodiment, the reconciliation monitor 30 divides the event flow 32 into two or more event sub-flows 34. As shown in FIG. 2, the reconciliation monitor 30 may use a filter 36 (e.g., a Boolean filter or multiple Boolean filters) to divide the event flow 32 into event sub-flow 34a and event sub-flow 34b. Using non-Boolean filters or a plurality of filters, the event flow 32 can be divided into more than two event sub-flows, as indicated in FIG. 2 by the ellipsis between event sub-flows 34a and 34b. More typically, each sub-flow may be associated with a unique Boolean filter that identifies events associated with, or that are part of, that sub-flow. As used herein, the term flow is meant to describe "an ordered set of event processing components" and the term stream (or event stream) is meant to describe "an ordered set of events".

The event sub-flows 34 may include all events in the event flow 32, but in most cases they will not. For example, if the filter 36 is configured to produce two sub-flows 34 corresponding with two specific security devices, then events from other security devices will not be in either sub-flow 34. Specific operation of the filter 36 is described further below.

Figure 3:
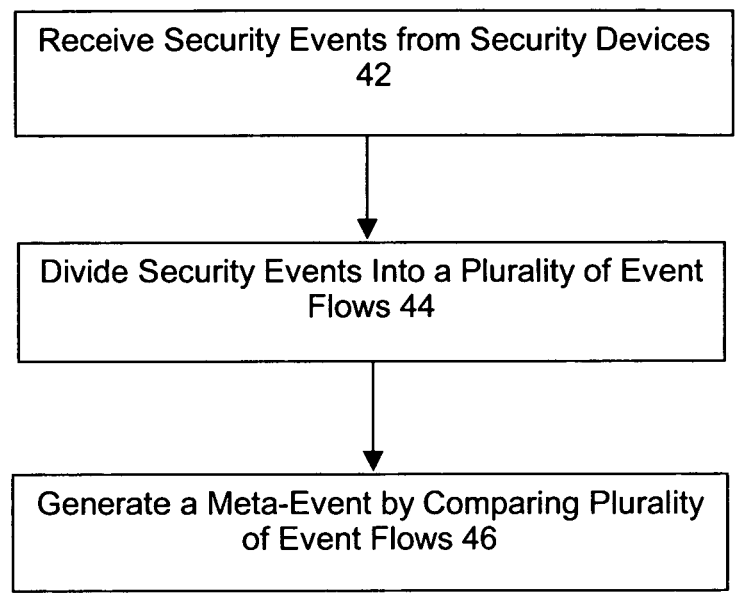
FIG. 3 is a flow chart illustrating a process for generating meta-events through a comparison of event streams according to one embodiment of the present invention.

In one embodiment, the event sub-flows 34 are provided to a comparison engine 38, which generates a meta-event 40 by comparing the event sub-flows 34 to one another. Specific operation of the comparison engine 38 and some examples of meta-events 40 are described further below. One embodiment of the security event processing described above is also illustrated by a flow-chart in FIG. 3. Referring to FIG. 3, in block 42 the security events are received, in block 44 they are divided into a plurality of flows (i.e., two or more sub-flows), and in block 46 the meta-event is generated based on comparing the two or more flows.

In one embodiment, a user may supply a set of event fields (e.g., SourceIP Address or AgentID, etc.). If the values from the fields from several events (one event per sub-stream) are comparable, (ordinarily they would need to be identical but in some cases a tolerance range may be given, for example when comparing event times, etc., and the two values may thus be considered identical if they fall within 15 seconds or so (or some other time tolerance) of one another) then those events are considered to be reconciled. If an event cannot be reconciled with comparable events from other streams then it is considered to be unreconciled. Meta-events may be generated whenever reconciled or unreconciled events are identified. In some cases, mathematical correlations may be computed (e.g., 1.0 if the event counts on all streams vary in synch; −1.0 if they vary in the inverse; and some value in between these endpoints (approaching 0) as the streams vary at random).

Referring again to FIG. 2, in one embodiment, the meta-event 40 is provided to the manager 14 for further processing 48. Such further processing may include providing the meta-event 40 to the notifier 24 to generate an alarm to one or more consoles 16.

In one embodiment, the operation of the filter 36 and the comparison engine 38 is determined based on configuration input 50. The configuration input may be provided by a user through a console/browser interface 16 (e.g., by the user selecting from a list of possible functionalities), it may be preconfigured, or the user may program it.

In one embodiment, the filter 36 is configured to divide the event flow 32 into two sub-flows 34. The first sub-flow 34a is filtered to contain security events from a first security device situated outside of a perimeter defense device. The second sub-flow 34b is filtered to contain security events from a second security device that is identical to the first security device, except that it is situated on the inside of the perimeter defense device.

For example, the perimeter defense device may be a Firewall set up to protect a LAN. One IDS is set up outside of the Firewall, and an identical (e.g., same make and model) IDS is set up inside the Firewall. Event sub-flow 34a contains events reported by the outside IDS while event sub-flow 34b contains events reported by the inside IDS.

In such an embodiment, the comparison engine 38 can be configured to evaluate the perimeter defense device by comparing the two event sub-flows 34. Since the two security devices are identical, an event can be determined to be stopped by the perimeter defense device, passed by the perimeter defense device, or introduced by the perimeter defense device. For example, using the IDS example above, if an event is seen by the outside IDS, but not by the inside IDS, the event was stopped by the Firewall. Events seen at both IDSs are passed by the Firewall, and events seen only by the inside IDS are introduced by the Firewall.

Using this information, the effectiveness of the Firewall—or other perimeter defense device—can be evaluated by the comparison engine. In such an embodiment, the meta-event 40 represents such an evaluation. For example, the meta-event 40 can indicate. The meta-events may be Reconciled Events or Unreconciled Events. A report of all Reconciled Events would inform the operator that these sorts of attacks are not being blocked by the firewall. A report regarding the Unreconciled Events would inform the operator which attacks are being blocked by the firewall.

Figure 4:
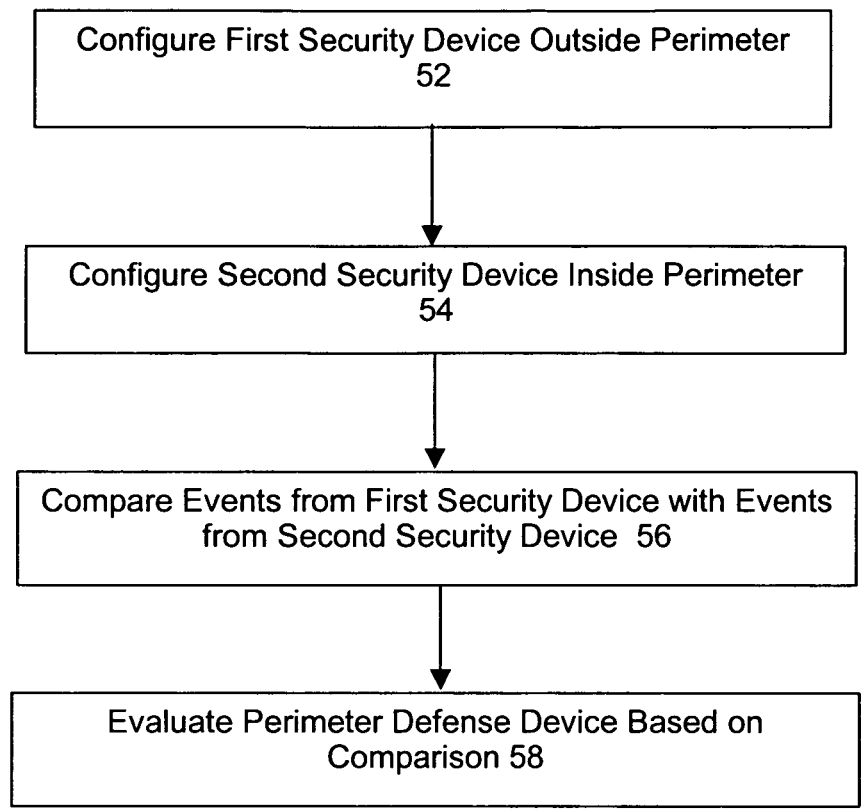
FIG. 4 is a flow chart illustrating a process for using security event processing to evaluate a perimeter defense device according to one embodiment of the present invention.

One embodiment of using the security event processing to evaluate a perimeter defense device is also illustrated by a flow-chart in FIG. 4. Referring to FIG. 4 in block 52 the first security device is configured outside of the monitoring perimeter, while in block 54 the second security device is configured on the inside. In block 56, security events received from the two security devices, respectively, are compared, and in block 58, the perimeter defense device is evaluated based on the comparison. In the example above, the filter 36 divided the event flow 32 into only two event sub-flows 34. However, in other embodiment, any other number of sub-flows higher than two can be used.

In another embodiment, referring again to FIG. 2, the filter 36 is also configured to divide the event flow 32 into two sub-flows 34. In this embodiment, the first sub-flow 34a is filtered to contain security events from a first security device. The second sub-flow 34b is filtered to contain security events from a second security device that is identical to the first security device. Thus, the event sub-flows 34 contain events from two identical security devices.

For example, the two identical security devices may be two identical IDSs by the same manufacturer set up to monitor the same network traffic. Thus, the two event sub-flows 34 are expected to be identical. In such an embodiment, the comparison engine 38 can be configured to detect whether one of the security devices has been tampered with by comparing the two event sub-flows 34. Since the two security devices are identical, any discrepancy in the two event sub-flows 34 may indicate tampering with one of the devices.

For example, if one of the IDS fails to report an event seen by the other IDS monitoring the same traffic, the comparison engine 38 can generate a meta-event 40 indicating suspected tampering with the IDS. In such an embodiment, the meta-event 40 represents such a tampering detection. In general, the meta-events may be Reconciled Events or Unreconciled Events and an operator may establish rules for handling same. For example, the operator may establish a rule that indicates in the event any Unreconciled Events are generated by the data monitor then one of the monitored devices has been compromised. Upon inspection of that meta-event, the operator could determine which of the monitored devices did not generate the expected event—indicating the device that has been tampered with. Alternatively, this inspection could be performed automatically (e.g., rule-based inspection) and a further Tampering Detected meta-event generated.

In the example above, the filter 36 divided the event flow 32 into only two event sub-flows 34. However, in other embodiment, any other number of sub-flows higher than two can be used. For example, if an attacker could have the ability to tamper with two IDSs simultaneously, then using three identical IDSs—and comparing three event sub-flows 34 respectively—would again provide tamper detection ability.

Figure 5:
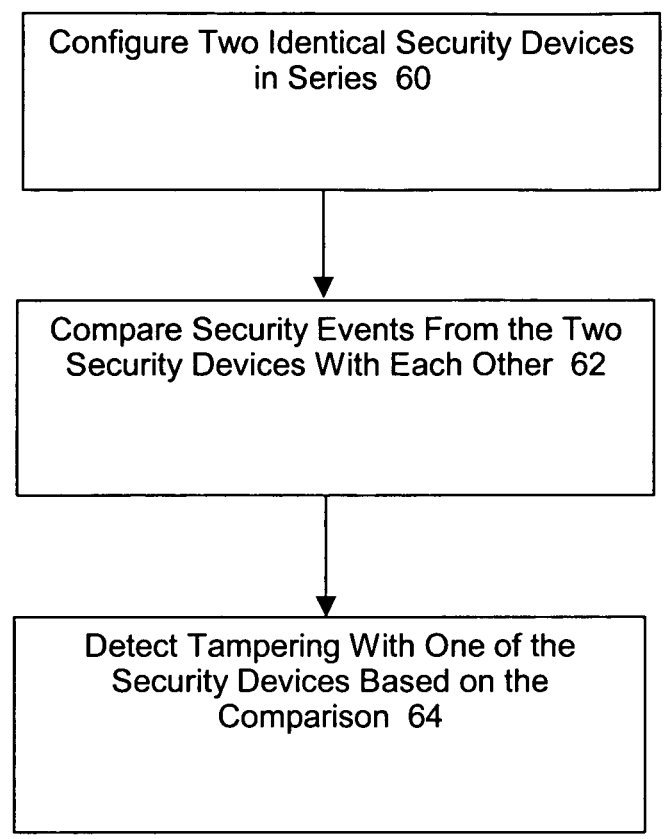
FIG. 5 is a flow chart illustrating a process for detecting tampering according to one embodiment of the present invention.

Tampering detection, according to one embodiment of the present invention, is also illustrated by a flow-chart in FIG. 5. Referring to FIG. 5, in block 60 two identical security devices are configured in series to listen to the same network traffic. In block 62, the security events from the two security devices are compared, and in block 64, tampering with one of the devices is detected based on the comparison.

In another embodiment, referring again to FIG. 2, the filter 36 is configured to divide the event flow 32 into two sub-flows 34. The first sub-flow 34a is filtered to contain security events from a first security device. The second sub-flow 34b is filtered to contain security events from a second security device that is not identical to the first security device. In other words, the two event sub-flows 34 are from two heterogeneous security devices.

The two devices can be heterogeneous in numerous ways. For example, they can be two devices of the same type from different vendors, e.g., an IDS from Cisco Systems and another from ISS. In one embodiment, they are two devices of similar types, but different scope, e.g., a HIDS and a NIDS. Alternatively, they may be completely dissimilar devices, such as a firewall and a router, for example.

In such an embodiment, the comparison engine 38 can be configured to evaluate the effectiveness of the two security devices by comparing the two event sub-flows 34. In one embodiment, by observing the events missed by one security device but seen by the other, and vice versa, an inference can be made about the effectiveness of the two security devices working together.

In one embodiment, the events contained in the event flow 32 are normalized, thus facilitating comparison of the two sub-flows 34 from two disparate security devices. In one embodiment, an event category as opposed to the event name form the basis of comparison.

In one embodiment, inferring the effectiveness and accuracy of the two security devices operating as a system can be done by a Kappa-enabled data monitor. In such an embodiment, the meta-event 40 represents such an evaluation. For example, a Kappa-enabled data monitor may generate Device Coverage meta-events that would include a percentage expressing the relation between attacks detected by the monitored devices and the universe of all attacks both known and unknown.

In the example above, the filter 36 divided the event flow 32 into only two event sub-flows 34. However, in other embodiment, any other number of sub-flows higher than two can be used. Furthermore, each sub-flow 34 can contain security events from more than just one security device. For example, all IDS events can be filtered into one sub-flow 34a and all Firewall events can be filtered into another sub-flow 34b. Furthermore, another sub-flow 34 can contain all router events. That is, the number of sub-flows 34 is not limited to two, and each sub-flow 34 can have events from numerous security devices depending on the configuration of the filter 36.

In one embodiment, the filter 36 is configured to divide the event flow 32 into two sub-flows 34 according to some classification, such as two different security devices. The comparison engine 38 can then be configured to statistically correlate the two event sub-flows 34 by comparing them to each other. Statistical correlation indicates how much one thing is related to another, ranging from completely like, to unrelated, to completely unlike.

In one embodiment, the two sub-flows 34 being compared for statistical correlation contain normalized security events. Using information about the statistical correlation between two event flows, an operator may watch for correlated variations in the traffic directed at, for example, particular ports. If the traffic directed at all ports associated with an SQLServer, for instance, suddenly spike together then one might strongly suspect that there is a virus spreading across mySQLServer installations. If the traffic on one port suddenly spikes while another suddenly falls, the operator might suspect a denial of service attack has suddenly cut the demand for the second port by tying up the first. Event Stream Correlation events may be generated periodically and a field of such meta-events may include a correlation value between 1 and −1.

In the example above, the filter 36 divided the event flow 32 into only two event sub-flows 34. However, in other embodiment, any other number of sub-flows higher than two can be used. Then, the sub-flows 34 may be correlated in pairs, or a group correlation may be calculated for all the event sub-flows 34.

Thus, a network security system has been described. In the forgoing description, various specific values and data structures were given names, such as "security event" and "event sub-flow," and various specific modules, such as the "reconciliation monitor" and "comparison engine" have been described. However, these names are merely to describe and illustrate various aspects of the present invention, and in no way limit the scope of the present invention. Furthermore, various modules, such as the manager 14, the filter 36, and the comparison engine 38 in FIG. 2, can be implemented as software or hardware modules, or without dividing their functionalities into modules at all. The present invention is not limited to any modular architecture either in software or in hardware, whether described above or not.

What is claimed is:

1. A method comprising:
   receiving a set of events from a plurality of security devices;
   dividing the set of events into a plurality of event flows, wherein an event flow represents a subset of the set of events;
   comparing the plurality of event flows;
   wherein the plurality of security devices comprises two or more identical security devices;
   wherein the plurality of event flows comprises two or more event flows, one event flow corresponding with each identical security device; and
   further comprising evaluating a perimeter defense device based on the comparison.

2. The method of claim 1, wherein at least one of the two or more identical security devices is outside a perimeter defined by the perimeter defense device, and at least another one of the two or more identical security devices is inside the perimeter defined by the perimeter defense device.

3. The method of claim 2, wherein the two or more identical security devices comprise two or more identical intrusion detection systems.

4. A method comprising:
   receiving a set of events from a plurality of security devices;
   dividing the set of events into a plurality of event flows, wherein an event flow represents a subset of the set of events;
   comparing the plurality of event flows;
   wherein the plurality of security devices comprises two or more identical security devices;
   wherein the plurality of event flows comprises two or more event flows, one event flow corresponding with each identical security device; and
   further comprising detecting that one of the identical security devices has been tampered with based on the comparison.

5. The method of claim 4, wherein the two or more identical security devices monitor identical network traffic.

6. A method comprising:
   receiving a set of events from a plurality of security devices;
   dividing the set of events into a plurality of event flows, wherein an event flow represents a subset of the set of events;
   comparing the plurality of event flows;
   wherein the plurality of security devices comprises two or more heterogeneous security devices;
   wherein the plurality of event flows comprises two or more event flows, one event flow corresponding with each heterogeneous security device; and
   further comprising evaluating effectiveness of the two or more heterogeneous security devices based on the comparison.

7. The method of claim 6, wherein the two or more heterogeneous security devices comprise two or more intrusion detection systems, each provided by a different vendor.

8. The method of claim 6, wherein the two or more heterogeneous security devices comprise a network intrusion detection system (NIDS) and a host-based intrusion detection system (HIDS).

9. A network security system comprising:
   a plurality of distributed agents to collect security events from a plurality of security devices;
   an agent manager to group the collected security events into an event flow;
   one or more filters to divide the event flow into a plurality of event sub-flows, wherein an event sub-flow represents a subset of the collected security events; and
   a comparison engine to compare the plurality of event sub-flows;
   wherein the plurality of security devices comprises a first security device situated outside of a perimeter defined by a perimeter defense device and a second security device situated inside the perimeter defined by the perimeter defense device;
   the one or more filters are configured to divide the event flow into two event sub-flows, one event sub-flow corresponding with each of the two security devices; and
   the comparison engine is configured to evaluate the perimeter defense device by comparing the two event sub-flows.

10. The network security system of claim 9, wherein the first and second security devices comprise two identical intrusion detection systems.

11. A network security system comprising:
    a plurality of distributed agents to collect security events from a plurality of security devices;
    an agent manager to group the collected security events into an event flow;
    one or more filters to divide the event flow into a plurality of event sub-flows, wherein an event sub-flow represents a subset of the collected security events; and
    a comparison engine to compare the plurality of event sub-flows;
    wherein the plurality of security devices comprises two identical network security devices configured to monitor identical network traffic;
    the one or more filters are configured to divide the event flow into two event sub-flows, one event sub-flow corresponding with each identical network security device; and
    the comparison engine is configured to detect whether one of the two identical network security devices has been tampered with by comparing the two event sub-flows.

12. A network security system comprising:
    a plurality of distributed agents to collect security events from a plurality of security devices;
    an agent manager to group the collected security events into an event flow;
    one or more filters to divide the event flow into a plurality of event sub-flows, wherein an event sub-flow represents a subset of the collected security events; and
    a comparison engine to compare the plurality of event sub-flows;
    the plurality of security devices comprises two heterogeneous security devices;
    the one or more filters are configured to divide the event flow into two event sub-flows, one event sub-flow corresponding with each of the heterogeneous security devices; and
    the comparison engine is configured to evaluate an effectiveness of the two heterogeneous network security devices by comparing the two event sub-flows.

13. The network security system of claim 12, wherein the two heterogeneous security devices comprise two intrusion detection systems, each provided by a different vendor.

14. The network security device of claim 12, wherein the two heterogeneous network security devices comprise a network intrusion detection system (NIDS) and a host-based intrusion detection system (HIDS).

15. A non-transitory machine-readable medium having stored thereon data representing instruction that, when executed by a processor, cause the processor to perform operations comprising:
- receiving a set of events from a plurality of network security devices;
- dividing the set of events into a plurality of event flows, wherein an event flow represents a subset of the set of events;
- comparing the plurality of event flows;
- wherein the plurality of network security devices comprises two or more identical network security devices;
- the plurality of event flows comprises two or more event flows, one event flow corresponding with each identical network security device; and
- the operations further comprise evaluating a perimeter defense device based on the comparison.

16. The non-transitory machine-readable medium of claim 15, wherein at least one of the two or more identical network security devices is outside a perimeter defined by the perimeter defense device, and at least another one of the two or more identical network security devices is inside the perimeter defined by the perimeter defense device.

17. A non-transitory machine-readable medium having stored thereon data representing instruction that, when executed by a processor, cause the processor to perform operations comprising:
- receiving a set of events from a plurality of network security devices;
- dividing the set of events into a plurality of event flows, wherein an event flow represents a subset of the set of events;
- comparing the plurality of event flows;
- wherein the plurality of network security devices comprises two or more identical network security devices configured to monitor identical network traffic;
- the plurality of event flows comprises two or more event flows, one event flow corresponding with each identical network security device; and
- the operations further comprise detecting that one of the identical network security devices has been tampered with based on the comparison.

18. A non-transitory machine-readable medium having stored thereon data representing instruction that, when executed by a processor, cause the processor to perform operations comprising:
- receiving a set of events from a plurality of network security devices;
- dividing the set of events into a plurality of event flows, wherein an event flow represents a subset of the set of events;
- comparing the plurality of event flows;
- wherein the plurality of network security devices comprises two or more heterogeneous network security devices;
- the plurality of event flows comprises two or more event flows, one event flow corresponding with each heterogeneous network security device; and
- the operations further comprise evaluating effectiveness of the two or more heterogeneous network security devices based on the comparison.

19. The non-transitory machine-readable medium of claim 18, wherein the two or more heterogeneous network security devices comprise two or more intrusion network security devices, each provided by a different vendor.

20. The non-transitory machine-readable medium of claim 18, wherein the two or more heterogeneous network security devices comprise a network intrusion detection system (NIDS) and a host-based intrusion detection system (HIDS).

* * * * *